(12) United States Patent
Kreidler et al.

(10) Patent No.: US 6,810,355 B1
(45) Date of Patent: Oct. 26, 2004

(54) BALANCE AND A METHOD FOR OPERATING A BALANCE

(75) Inventors: Sabine Kreidler, Epfendorf (DE); Klaus Weber, Albstadt (DE); Karl-Heinz Schmid, Albstadt (DE)

(73) Assignee: Mettler-Toledo, Albstadt (DE)

( * ) Notice: Subject to any disclaimer, the term of this patent is extended or adjusted under 35 U.S.C. 154(b) by 0 days.

(21) Appl. No.: 10/363,091

(22) PCT Filed: Jul. 26, 2001

(86) PCT No.: PCT/EP01/08670
§ 371 (c)(1),
(2), (4) Date: Feb. 28, 2003

(87) PCT Pub. No.: WO02/18887
PCT Pub. Date: Mar. 7, 2002

(30) Foreign Application Priority Data

Aug. 31, 2000 (DE) ......................................... 100 42 966

(51) Int. Cl.$^7$ .......................... G01G 19/00; G01G 19/22
(52) U.S. Cl. ................. 702/173; 177/25.13; 177/25.14; 705/21
(58) Field of Search ................................ 702/101, 173, 702/174; 177/25.11, 25.12, 25.13, 25.14, 48, 136, 137; 705/21, 409, 414; 380/51

(56) References Cited

U.S. PATENT DOCUMENTS

| | | | | |
|---|---|---|---|---|
| 4,462,474 A | * | 7/1984 | Bordeaux et al. | 177/48 |
| 4,780,828 A | | 10/1988 | Whisker | 705/404 |
| 4,804,052 A | * | 2/1989 | Griffen | 177/25.14 |
| 5,052,504 A | * | 10/1991 | Ikeda et al. | 705/21 |
| 5,243,655 A | * | 9/1993 | Wang | 380/51 |
| 6,153,835 A | * | 11/2000 | Schwartz et al. | 177/25.13 |

FOREIGN PATENT DOCUMENTS

| | | |
|---|---|---|
| DE | 4441231 | 3/1996 |
| EP | 0201301 | 11/1986 |
| EP | 0911618 | 4/1999 |

OTHER PUBLICATIONS

Grottker, Ulrich, Software–Prüfungen Nach Welmec–Leitfaden 2.3. In: Wägen + Dosieren May 1997, S. 15–24.
Brandes, Peter: Einige Auslegungsbeispiele Von Vorschriften Der OIML R 76–1 In: Wägen— Dosieren Jun. 1992, S3, 4, 6–10.
Drahtloses Datenübertragungs– Und –Verarbeitungssystem Für Datenübertragung IM Eichpflichtigen Verkehr. In: Wägen= Dosieren, Feb. 1983, S. 48, 49.

* cited by examiner

Primary Examiner—John Barlow
Assistant Examiner—John Le
(74) Attorney, Agent, or Firm—Friedrich Kueffner

(57) ABSTRACT

In a scale with a weighing cell, which can generate weight signals representing the weight of a load each time something is weighed, and with a signal processing system which receives the weight signals and generates:
- weight data on the basis of the weight signals,
- information determined on the basis of the weight data such as purchase prices, and/or
- weighing data containing identification data designating the weighing operation or group of associated weighing operations in question, an elaboration is proposed, according to which the signal processing system has an encryption unit, which can generate encryption data on the basis of at least some of the weighing data, where the signal processing system can transmit a data record containing at least the portion of the weighing data used to generate the encryption data together with the encryption data.

26 Claims, No Drawings

BALANCE AND A METHOD FOR OPERATING A BALANCE

BACKGROUND OF THE INVENTION

1. Field of the Invention

The invention pertains to a scale with a weighing cell, which is used during each weighing operation to generate weight signals representing the weight of a load, and with a signal processing system, which receives the weight signals for the purpose of generating:

- weight data on the basis of the weight signals,
- information determined on the basis of the weight data such as purchase prices, and/or
- weighing data containing identification data which identify the weighing operation or group of associated weighing operations in question, to an interconnected system with a scale of this type, and to methods for operating a scale of this type and the corresponding interconnected system.

2. Description of the Related Art

Scales of this type are used in, for example, retail shops and supermarkets for weighing individual products such as meat, sausage, cheese, fruit, and vegetables. In the usual case, the purchase prices for the weighed products are determined on the basis of the weight data and the base prices assigned to the merchandise. This base price can be entered directly on a keyboard or called up from a memory unit by the use of, for example, a code, which is read by a barcode reader. During the operation of conventional scales; several separate weighing operations are often carried out during the handling of an individual sales transaction, and the weighing data produced by such transactions must be processed all together and printed out, usually at the conclusion of the sales transaction. For this purpose, the weighing data are usually stored in bookkeeping memories assigned to the individual sales transactions. In the course of a sales transaction, it can also become necessary to use several scales and to continue to process the weighing data generated by the previously used scale together with those generated by the other scale. In known interconnected systems of scales, it is possible for this purpose to transmit these weighing data over appropriate data lines.

In view of the range of functions which the known scales must perform and especially in view of the operation of scales in an interconnected system, modern scales have a so-called PC architecture consisting of a conventional PC main board, a conventional graphics card, a display unit connected to the graphics card, a hard disk drive, possibly additional drives for reading other types of data storage media, and one or more interfaces, etc. The PC main board forms a part of the signal processing system. In addition, this signal processing system usually has a signal processing unit, which receives the weight signals transmitted from the weighing cell in the form of crude measurement data. In the signal processing system, the actual weight data representing the weight values are usually generated from the weight signals, which ate in the form of crude digital values, by the use of model-specific and machine-specific parameters; these weight data are then sent via an appropriate I/O port or an appropriate interface to the PC main board for further processing. This signal processing system of the known scales is usually separated physically from the PC main board and realized in the form of a separate circuit or card. This makes it very easy to ensure the calibration security required for the determination of the weight data representing the weight values.

In the known scales, the weight data determined by the signal processing system are read out from the signal processing system by a default program and subjected to further processing to determine, for example the price data. In addition, this default program can also be used to transmit the weight data and other information derived from the weight data, for example, to other machines, especially to other scales. With respect to the relevant calibration laws, the programs used for the processing and/or transmission of weighing data and the associated hardware must be officially inspected and approved by the authorized standards institution. This inspection must usually be repeated every time a new function is added to the program or every time a user wants to use one of his own program such as an inventory management program, a bookkeeping program, or a merchandise management application, on the scale in addition to the already inspected default program. For this reason, the known PC scales are often not used to run programs of this type and thus often not used as components of a higher-level merchandise management system, because such programs or systems are frequently modified and it is not economically feasible to have the entire system inspected again according to the calibration regulations every time one of these modifications is made.

This problem was addressed as early as 1995, in which year the "WELMEC Guide to the Testing of Software for Non-Automatic Scales" was published. This guide compiles the key requirements for protecting software subject to the calibration law against unintentional and intentional changes as well as the key requirements on the software for freely programmable modules or for accessory units of scales subject to the calibration law. In agreement with its stated goals, however, this guide describes only the most essential properties of the scales and of the software used to operate the scales; it does not provide any concrete technical solutions. Only with respect to the protection of the software subject to the calibration law, which comprises both the functions subject to the calibration law such as:

- the weight determination,
- the price calculation,
- the visual display of these data, and
- the printout of these data, and the model-specific and machine-specific parameters subject to the calibration law, it is proposed, as a way of providing security against intentional and unintentional changes, that a check sum be calculated via the machine code which contains the program segments and parameters subject to the calibration law and that the program of the software subject to the calibration law be prevented from starting if is determined on the basis of a comparison of this check sum with a predetermined checksum that a change has occurred in the machine code.

With respect to the communications between the software subject to the calibration law and the freely programmable software segments not subject to the calibration law, the use of a non-reactive software interface is proposed, a software interface being defined as "non-reactive" when only a precisely defined number of parameters and functions of the software segment subject to the calibration law can be affected via this interface and the two software segments cannot exchange any data over any other (undefined) link.

These solutions make it possible to operate freely programmable program segments on scales subject to the calibration law without the necessity of having an official inspection and approval procedure performed in accordance with the calibration law every time a modification is made to the program segments subject to the calibration law.

Nevertheless, the approaches suggested in the WELMEC Guide still do not make it possible to read out data such as weight data and data derived from them, especially price data, which have been acquired with the help of functions subject to the calibration law, from the protected program segment of a scale, to process them with a program segment not subject to the calibration law, or to transmit them to a different scale and to read them back again to the program segment subject to the calibration law of this or a different scale, because the measures indicated above cannot prevent the manipulation of the weighing data by the freely programmable program segment or the visual display or printout of these manipulated weighing data on a device subject to the calibration law such as a scale.

SUMMARY OF THE INVENTION

In view of these problems of the state of the art, the invention is based on the task of providing a scale of the type described above which, while ensuring calibration security, makes it possible to transmit data subject to the calibration law between individual program segments or units by the use of freely programmable programs not subject to the calibration law.

This task is accomplished according to the invention by an elaboration of the known scales, which is characterized essentially in that the signal processing system has an encryption unit, by means of which, on the basis of at least some of the weighing data, encryption data can be generated, and in that the signal processing system can be used to output a data record containing at least the portion of the weighing data used to generate the encryption data together with the encryption data.

DETAILED DESCRIPTION OF THE INVENTION

The invention is based on the surprisingly simple realization that, when data are exchanged between program segments subject to the calibration law and freely programmable program segments, it is possible to obtain effective protection against manipulations of the data by the freely programmable program segment while simultaneously ensuring that these data can be processed by freely programmable program segment by using a suitable encryption unit, which is then also subject to the calibration law, to encrypt the data before they are sent to the freely programmable program segment and to transmit the data together with the encryption data thus obtained to the freely programmable program segments. When these data are then sent back to the program segments subject to the calibration law of the same scale or of a different scale, the encryption unit subject to the calibration law can generate new encryption data on the basis of the weighing data it has received and compare these new data with the original data record encryption data which have also been transmitted to it in order to determine in this way whether any manipulations of the weighing data have occurred.

It is advisable for the encryption unit of the scale according to the invention to form a part of the program subject to the calibration law, which has been secured against manipulations by means of the previously explained check sums. A known algorithm (e.g., CRC32), which also includes, however, a secret key, can be used both for the formation of the check sum or test sum by way of the program modules and parameters subject to the calibration law and for the encryption of the weight data. The check sum in this case is the result of the running of the algorithm or of the calculation rule, which uses a given quantity of data to calculate a sequence of numbers, which is equivalent to a fingerprint of this set of data. This means that even very small changes in the input data cause a change in the check sum. The calculation rule is advisably selected so that any modifications to the data cause a large change in the check sum, so that it is highly unlikely that different sets of input data would lead to the same check sums, so that it is extremely difficult to infer anything concerning the parameters of the calculation rule from the check sum and the data, and so that the check sums are distributed uniformly over the available value space. When the encryption unit of the scale according to the invention satisfies these requirements, the further processing, especially the visual display of manipulated weighing data, can be reliably prevented by the program segment subject to the calibration law, because changes in the weighing data can be recognized by the encryption unit present in the secured program on the basis of the encryption data.

As already explained in detail above in conjunction with conventional scales, the signal processing system is advisably designed to drive a display unit and a printer, so that at least some of the weighing data can be displayed and/or printed out.

When scales according to the invention are used, it has also been found to be especially effective, as a way of ensuring calibration security while simultaneously providing for simplicity of production and calibration, for the signal processing system to have a signal processing unit, which can be used to generate the weight data on the basis of the weight signals and machine-specific parameters, and a physically separate data processing unit in the form of, for example, a separate circuit or card to receive the weight data and to generate the other weighing data, because, with this system, the same data processing unit such as a PC main board can be used for all the scales, and only the signal processing unit needs to be adapted appropriately to the specific properties of the machine.

In this case the data processing system is advisably able to run a default program, which generates, receives, and/or processes the weight data and which preferably also realizes the encryption unit. To prevent unintentional or intentional changes, this program preferably also comprises, in view of the previously mentioned WELMEC Guide, a checking routine, by means of which, every time the program is called up, additional encryption data are first generated on the basis of the program data and/or the parameters required for generating the weight data and compared with predetermined test data. These predetermined test data can be stored in a text file. In view of the applicable calibration regulations, it is not absolutely necessary to protect these test data against changes, because these test data are merely the result of an encryption process based on the use of a secret key, and this result allows no inferences to be made concerning either the encryption process or the encrypted data.

In applications where the scale according to the invention makes use of freely programmable program segments, the unchecked transmission of weight data to these freely programmable program segments can be prevented with a very high degree of reliability by having the data processing unit transmit a password to the signal processing unit when the default program subject to the calibration law is called up and by providing the signal processing unit with a comparison unit, which can compare this password with a password stored in the signal processing unit. The system is released for the transmission of the weight data only if the transmitted password and the password stored in the signal processing unit agree. In an especially preferred embodiment, it is provided that the signal processing unit has a blocking mechanism, which automatically blocks the transmission of the weight data if the specified password is not transmitted again by the data processing unit within a predetermined period of time, such as 60 seconds after the first transmission of the password. Each time the signal processing unit is turned off and then back on again, it is advisable for it to remain blocked until the password is transmitted from the data processing unit and it has been verified that this password agrees with the password stored in the signal processing unit.

As already explained above, the data processing unit of the scale according to the invention can also be used to run other programs not subject to the calibration law, by means of which, if desired, the data records generated by the default program can be called up, subjected to further processing, and transmitted to other scales, and/or by means of which data records obtained from other scales can be transmitted to the default program. To obtain the necessary calibration security, it is provided that only the default program can operate the display unit and the printer. This can be done, for example, by making use of routines provided by conventional operating systems such as Windows NT, by means of which routines it is possible to reserve specific hardware resources such as hardware interfaces exclusively for default programs, so that no other program can access these hardware resources. It is provided in an especially preferred embodiment that the default program contains an additional checking routine, which checks to see whether the signal processing unit is allowed to output weight data and which allows the visual display or the printout of the information contents generated by the additional program only if the output of the weight data by the signal processing unit is not released, i.e., is blocked. Through the use of this additional checking routine, it is possible to use the display unit of the scale or the printer to display visually or to print out any desired information content, provided that the scale is blocked for a weighing operation, without as a result endangering the calibration security, because in this case as well the printer and the display unit are driven exclusively by the protected program segment subject to the calibration law. In this context, it is also possible to reserve certain individual display fields of the display unit for the visual display of the weighing data and to release the other display fields for the visual display of other information content, where the display fields reserved for the visual display of the weighing data are released for the visual display of other information content as soon the checking routine determines that the signal processing unit is blocked from transmitting weight data. In this case, the signal processing unit can be released or blocked by the input of a release or blocking signal generated by a suitable input device such as an input keyboard, a .... for establishing a connection with another machine, etc.

Another way of securing the scale according to the invention against unauthorized access to the weighing data can be provided by giving the default program a third checking routine, which compares a password transmitted by the additional program with a password contained in the default program and which allows the transmission of data records only when it finds that the two passwords agree. This ensures that data records can be transferred by the default program only to programs which can prove to the default program that they are authorized. In an especially advantageous embodiment of the invention, this authentication of the freely programmable program segments is handled by the so-called challenge-response method. Here the default program receives the instruction from the freely programmable program segment to transmit a random value (=challenge) to the freely programmable program segment. Then, the freely programmable program segment modifies this transmitted value according to a generally known algorithm (CRC32), to which modified value, however, a secret key is also added. The encryption data thus determined on the basis of the random value are then transmitted back to the default program and compared by this default program with encryption data determined by the default program on the basis of the random value. The freely programmable program segment is granted access to the default program or data records are allowed to be transmitted from the default program to the freely programmable program only if the default program establishes agreement between the two sets of encryption data.

It is advisable for the signal processing system to have a memory unit for storing the data records consisting of the weight data and the associated encryption data. With respect to the application of scales according to the invention as explained above for handling a plurality of sales transactions, each comprising a plurality of weighing operations, it has been found to be especially effective for the memory unit to have a plurality of default memory areas, each of which is designed for the storage of:

bookkeeping data, comprising the weighing data generated in the course of a bookkeeping operation, each of which comprises a plurality of weighing operations, and the associated encryption data.

For the identification of the individual sets of bookkeeping data, it is especially useful if the default memory areas are designed to store the identification data designating the bookkeeping operation in question and the encryption data generated therefrom in the form of header data for the bookkeeping data. These header data can, for example, comprise the serial number of the machine on which the first set of weighing data of the bookkeeping operation was generated, the clock time, the date on which the first bookkeeping entry was made, and a check sum (encryption data), determined on the basis of these data.

With respect to the relevant calibration regulations, it is necessary in the case of the scales according to the invention to prevent the bookkeeping data belonging to a bookkeeping operation from being printed out multiple times. In this regard, it has been found to be especially advisable for the header data, possibly together with additional data, to be stored in a printer memory area of the memory unit after the bookkeeping data in question have been printed out. A duplicate printout of the bookkeeping data by the scale can be prevented by giving the signal processing system a fourth checking routine, which compares the header data of the bookkeeping data to be printed out with the header data previously stored in the bookkeeping memory area and allows the printout only if agreement is not established between these two sets of data.

As already explained above, it is especially advisable in cases where sales transactions are handled on several different sales devices for the signal processing system to be designed to receive data, preferably in the form of bookkeeping data with the associated header data and encryption data, from another program and/or another scale, and for the encryption unit to be able to encrypt the received data and to compare the encryption data which it has thus produced itself with the encryption data which it has received, the further processing of the received weighing data by the default program being allowed only if these two sets of encryption data agree. In this case, the duplicate printout of bookkeeping data on various machines, especially scales, used during the course of a sales transaction can be prevented, if the signal processing system can compare the received weighing data, especially the header data, with the data previously stored in the printer memory area. The received data are released for processing only if agreement is not established between the received data and the data stored in the printer memory area.

In view of the calibration regulations, it is usually necessary during the operation of scales according to the invention for it to be possible to display weighing data even in cases where the display unit of the scale is being used to display information content generated by other program segments not subject to the calibration law. To ensure that the data which fall under the calibration regulations can be visually displayed during the weighing operation, the signal processing system of the scale according to the invention advisably has a monitoring unit, which can be used to monitor the visual display of the weighing data. The invention includes in particular the idea of using embodiments in which the weighing data are displayed within a display window (Windows window) made available by the operating system, to which a fixed size and position are assigned, and to which the operating system gives the property of always being in the foreground. It is then possible for the default program to check the window at short intervals to see whether it is still in the foreground or not. If it is found during this monitoring operation that the window is covered by a window generated by a freely programmable program segment, the default window can be brought back automatically into the foreground. Alternatively, the invention also includes the idea of immediately interrupting the weighing operation of the signal processing unit and/or of displaying an error message in this situation. The invention also includes the idea of realizing the monitoring unit in such a way that, in addition to or as an alternative to the monitoring function just described, an operating system function is repeatedly called in cycles, this function ensuring that the window made available for the visual display of the weighing data lies on top of all other windows. It can be provided that the signal processing unit is automatically blocked whenever this monitoring unit is rendered inactive by a freely programmable program segment, as a result of which the reading of the weight values is blocked on the hardware level.

As already explained above, the invention also includes the idea that the scale according to the invention can operate without the performing a weighing function; according to this idea, the entire display unit can be used for the visual display of information content generated by freely programmable program segments. For this case, the signal processing system advisably has an activation unit, which activates the monitoring unit as soon as it is determined by the additional checking routine that the signal processing unit has been released for the transmission of weight data.

For the input of identification data, other merchandise-specific data, sales transaction-related data, or data required for running freely programmable programs, the scale according to the invention may require an input unit for the entry of identification data, data required for the processing of the weighing data, and/or other data. This input unit can comprise an input keyboard, a barcode reader, a scanner, a receiver designed to receive signals transmitted by a transponder, and/or a speech recognition unit.

As already explained above, the scale according to the invention is used to particular advantage in an interconnected system with at least one scale and at least one additional machine, preferably a sales device, especially an additional scale and a data transmission unit which can be used to transfer data records between these machines. The data transfer unit can be a network such as a LAN, an intranet, or the Internet. In addition, the idea of the invention also includes the use of data transfer units with at least one transmitter and at least one receiver for the wireless transmission of the data records. As can be derived from the preceding explanation of the scales according to the invention, a method according to the invention for operating a scale in which, each time something is weighed, weight signals representing the weight of the load are generated and transmitted to a signal processing system which can generate weighing data comprising weight data, data derived from the weight data, and/or identification data, is characterized essentially in that at least some of the weighing data are encrypted and transmitted in the form of a data record together with the encryption data thus obtained and/or stored in a memory unit, where, in an especially advantageous embodiment of the invention, the visual display of the weighing data by a display unit of the scale is monitored continuously. In addition, by the use of the scales according to the invention, a method according to the invention for operating an interconnected system can be implemented, in which data records containing weighing data and encryption data generated from those data are transmitted between the individual machines of the interconnected system, this method being characterized essentially in that it encrypts the weighing data of the transmitted data records and compares the encryption data thus obtained with the transmitted encryption of the data records, and further processing of the transmitted data records is allowed only if agreement is established between these two sets of encryption data.

A sales transaction using an interconnected system according to the invention is explained below on the basis of an example. In the individual machines of the interconnected system, internal bookkeeping memory areas (Bs) are maintained for all bookkeeping operations. If the content of a bookkeeping memory area is to be transmitted to another machine, the number of the target machine must be stated by the program executing the data transmission. A check sum can be formed on the basis of the number of the target machine.

The relationship between the bookkeeping memory areas and individual sales clerks executing the sales transactions has no technical relevance with respect to calibration. The only point which is important for establishing that the weighing data generated during the course of a weighing operation belong together is the number of the bookkeeping memory area. This means that the freely programmable program segment must ensure that the weighing data are entered into the correct bookkeeping memory area. This can be done, for example, by having the sales clerk in question push a sales clerk key assigned to him/her each time he/she performs a weighing operation. The bookkeeping memory areas themselves cannot be created or erased. A sufficient number of them is made available by the default program subject to the calibration law and therefore secured. This number also determines the maximum number of bookkeeping entries which can be carried out simultaneously. The same number of bookkeeping memory areas is present in all machines of the interconnected system. As an alternative to the sales clerk number, it is also possible to use so-called "shopping basket numbers" to assign individual weighing operations to predetermined bookkeeping memory areas, which means that it is not the sales clerk and the customer who go from machine to machine or from scale to scale but rather the customer's shopping basket, each of which is given a special number, which is passed on from one scale to another. All bookkeeping data have a header with the information listed in the following table; these data are protected against manipulation by a check sum. This information is generated when the first set of weighing data is entered into the bookkeeping memory area. Further entries of weighing data into the same bookkeeping memory area bring about no changes in that information.

TABLE 1

| Receipt Originator | Starting Time and Date | CRC |
|---|---|---|
| Number of the machine on which the first set of sales data was generated. | Time and date on which the first set of sales data was generated. | Check sum. |

Each machine stores all the weighing data in internal bookkeeping memory areas (Bs1 to Bs(N)) according to the diagram in the following table. In addition, the bookkeeping memory area in question is reinitialized after the data stored in the bookkeeping memory area are printed out and after these bookkeeping data are requested by a different machine. This means that all entries in the bookkeeping memory area are erased, and a new bookkeeping operation can begin.

TABLE 2

| Bs1 | Bs2 | Bs . . . | BsN |
|---|---|---|---|
| Header | . . . | . . . | Header |
| Entry 1 | . . . | . . . | Entry 1 |
| Entry 2 | . . . | . . . | Entry 2 |
| . . . | . . . | . . . | . . . |
| Entry M | . . . | . . . | Entry M |

When the bookkeeping data stored in a bookkeeping memory area are printed out, the . . . is protocolled in a printer memory area of the machine, in that the header of the printed bookkeeping memory area is saved to a file. In addition, the time at which the data were printed out is also recorded. The entry itself is made before the printing operation. A notation indicating the successful completion of the printing operation is entered after the printout has been completed. A check sum covering the entire file is formed, which is added at the end. The printer data are protocolled as indicated in the following table.

TABLE 3

| Printing Time and Date | Receipt Originator | Starting Time and Date | Completed? |
|---|---|---|---|
| YYYYMMDDhhmmss | G(X) | YYYYMMDDhhmmss | 1 |
| YYYYMMDDhhmmss | G(Y) | YYYYMMDDhhmmss | 1 |
| . . . | . . . | . . . | . . . |
| YYYYMMDDhhmmss | G(Z) | YYYYMMDDhhmmss | 0 |

The printer memory area is maintained by the ring buffer method. This means that the first entry is overwritten after a predetermined number of printing operations.

Under the assumption that various bookkeeping entries have been made in the bookkeeping memory area N (Bs(N)) in one machine (X) (G(X)), the following sequence results upon the continuation of the corresponding sales transaction at a different machine:

If, in the one machine Y (G(Y)), a bookkeeping entry is to be made to the bookkeeping memory area Bs(N), this bookkeeping memory area is first read out from the machine G(X) by a freely programmable program segment so that it can be entered into the corresponding bookkeeping memory area of the machine G(Y). For this purpose, the freely programmable program segment requests the corresponding bookkeeping data from the machine G(X), stating the designation of the target machine G(Y). Then the data record shown in the following table is handed over to the freely programmable program segment.

TABLE 4

| Receipt Originator | Starting Time and Date | | CRC |
|---|---|---|---|
| Bookkeeping Entry 1 | | | |
| Bookkeeping Entry 2 | | | |
| Bookkeeping Entry . . . | | | |
| Bs(N) | G(X) | G(Y) | CRC |
| Bookkeeping Memory Area N | From Machine | To Machine | CRC |

The last line of this record is generated by the default program and attached to the end of the bookkeeping data.

The freely programmable program segment then transmits the given record via a freely selectable transmission unit to the machine G(Y). In the machine G(Y), the freely programmable program segment hands over the record to the secured program segment subject to the calibration law of the machine G(Y). After the data have been handed over to the freely programmable program segment, the corresponding bookkeeping memory area (Bs(N)) in the machine G(X) is reset or erased. The default secured program of the machine G(Y) then checks the following conditions:

1. Is the bookkeeping memory area Bs(N) free at the moment (no entries present)?
2. Is the number of the target machine the same as the local machine number?
3. Is the transmitting header (receipt originator, starting time, and date) also absent from the printer memory area of this machine?

If these conditions are satisfied, the transmitted bookkeeping data are entered by the default program of the machine G(Y) into the corresponding bookkeeping memory area (Bs(N)) of this machine. Then the following condition is obtained in the memory unit of the machine G(Y):

TABLE 5

| Bs 1 | Bs 2 | Bs . . . | Bs N |
|---|---|---|---|
| Header | . . . | . . . | Header |
| . . . | . . . | . . . | Entry 1 |
| . . . | . . . | . . . | Entry 2 |
| . . . | . . . | . . . | . . . |

In the machine G(Y), it is now recorded that the bookkeeping data were received in the bookkeeping memory area Bs(N) from G(X). If a freely programmable program segment were to attempt to transmit these bookkeeping data twice, this would be noticed on the basis of the header data. If the bookkeeping data are printed by G(Y), the entry is made in the corresponding printer memory area of this machine, and the printer memory area in question is erased. This prevents the bookkeeping data from being printed out twice.

What is claimed is:

1. Scale with a weighing cell, which can generate weight signals representing the weight of a load each time something is weighed, and with a signal processing system which receives the weight signals and generates:

weight data on the basis of the weight signals, information determined on the basis of the weight data and/or weighing data containing identification data designating the weighing operation or group of associated weighing operations in question, wherein the signal processing system has an encryption unit, by means of which encryption data can be generated on the basis of at least some of the weighing data, and in that the signal processing system can transmit a data record containing the portion of the weighing data used to generate the encryption data together with the encryption data, wherein the signal processing system is designed to receive with weighing data and the associated encryption data from an additional program and/or another scale.

2. Scale according to claim 1, wherein a display unit which can be actuated by the signal processing system to display visually at least some of the weighing data.

3. Scale according to claim 1, wherein a printer, which can be driven by the signal processing unit to print out at least some of the weighing data.

4. Scale according to claim 1, wherein the encryption unit can be used to encrypt the received weighing data and to compare the encryption data thus obtained with the received encryption data, the received weighing data being released for further processing only if these two sets of encryption data agree.

5. Scale according to claim 1, wherein the signal processing system can be used to compare the received weighing data, especially the header data, with the data stored in the printer memory area, the received data being released for further processing if the received data and the data stored in the printer memory area do not agree.

6. Scale, especially according to claim 1, with a weighing cell, which can generate weight signals representing the weight of a load each time something is weighed, and with a signal processing system which receives the weight signals and generates:

weight data on the basis of the weight signals, information determined on the basis of the weight data and/or weighing data containing identification data designating the weighing operation or group of associated weighing operations in question, and with a display unit, which can be driven by the signal processing system visually to display at least some of the weighing data, characterized in that the signal processing system has a monitoring unit which can monitor the visual display of the weighing data.

7. Scale according to claim 6, wherein the signal processing system has an activation unit, which activates the monitoring unit as soon as the additional checking routine finds that the signal processing unit has been released for transmitting weight data.

8. Scale according to claim 1, wherein an input unit for entering identification data and/or for entering the data required for processing the weight data and/or for entering additional data.

9. Method for operating a scale according to claim 8, in which weight signals representing the weight of a load are generated each time an item is weighed, these signals then being sent to a signal processing system, which can generate weight data, information derived from the weight data, and/or weighing data comprising identification data, characterized in that at least some of the weighing data is encrypted and transmitted in the form of a data record together with the encryption data thus obtained and/or stored in a memory unit.

10. Method, especially according to claim 9, in which weight signals representing the weight of a load are generated each time an item is weighed, these signals then being sent to a signal processing system, which can generate weight data, information derived from the weight data, and/or weighing data comprising identification data, and a display unit is driven to generate a visual display of at least some of the weighing data, wherein the visual display of the weighing data is monitored.

11. Interconnected system with at least one scale according to claim 1 and at least one additional machine, preferably a sales device, especially a scale, and a data transmission unit which can be used to transmit data records between these machines.

12. Interconnected system according to claim 11, wherein the data transmission unit comprises a network selected from the group consisting of a LAN, an intranet, or the Internet.

13. Interconnected system according to claim 11, wherein the data transmission unit has at least one transmitter and at least one receiver for the wireless transmission of the data records.

14. Method for operating an interconnected system according to claim 11, in which weighing data and data records containing encryption data generated from the weighing data are transmitted between the individual machines of the interconnected system, wherein the weighing data of the transmitted data records are encrypted, and the encryption data thus obtained are compared with the transmitted encryption data of the data records, where the transmitted data records are released for further processing only if it is found that these two sets of encryption data agree.

15. Scale with a weighing cell, which can generate weight signals representing the weight of a load each time something is weighed, and with a signal processing system which receives the weight signals and generates:

weight data on the basis of the weight signals, information determined on the basis of the weight data, and/or weighing data containing identification data designating the weighing operation or group of associated weighing operations in question, wherein the signal processing system has an encryption unit, by means of which encryption data can be generated on the basis of at least some of the weighing data, and in that the signal processing system can transmit a data record containing the portion of the weighing data used to generate the encryption data together with the encryption data, wherein the signal processing system has a signal processing unit, which can generate the weight data on the basis of the weight signals and machine-specific parameters, and a data processing unit separate from the signal processing unit, which data process unit receives the weight data and generates the other weighing data, wherein the data processing system can run a default program, by means of which the weight data are generated, received, and/or processed, and wherein the default program has a checking routine, which, every time this program is called up, first generates additional encryption data on the basis of the program data and/or on the basis of the parameters generated to generate the weight data and then compares these encryption data with the default checking data.

16. Scale according to claim 15, wherein, when the default program is called up, the data processing unit can send a password to the signal processing unit, and in that the signal processing unit comprises a comparison unit, which can compare this password with a password stored in the signal processing unit.

17. Scale according to claim 15, wherein the data processing unit can run an additional program, which can call up, if desired, the records generated by the default program.

18. Scale according to claim 17, wherein only the default program can drive the display unit visually to display information content generated by the additional program.

19. Scale according to claim 18, wherein the default program has a checking routine, which checks to see whether the signal processing unit has been released to transmit weight data and releases the visual display or printout of the information content generated by the additional program only if the transmission of weight data from the signal processing unit has not been released.

20. Scale according to claim 17, wherein only the default program can drive the printer to print out information content generated by the additional program.

21. Scale according to one of claim 15, wherein the default program has a third checking routine, which compares a password transmitted by the additional programs with a password contained in the default program, and in that the transmission of the data records is allowed only if agreement is established between these two passwords.

22. Scale with a weighing cell, which can generate weight signals representing the weight of a load each time something is weighed, and with a signal processing system which receives the weight signals and generates:

weight data on the basis of the weight signals, information determined on the basis of the weight data, and/or weighing data containing identification data designating the weighing operation or group of associated weighing operations in question, wherein the signal processing system has an encryption unit, by means of which encryption data can be generated on the basis of at least some of the weighing data, and in that the signal processing system can transmit a data record containing the portion of the weighing data used to generate the-encryption data together with the encryption data, wherein the signal processing system has a memory unit for storing the weight data and the associated encryption data, wherein the memory unit has a plurality of default memory areas, each of which is designed for the storage of bookkeeping data and the associated encryption data, the bookkeeping data comprising the weighing data generated in the course of a bookkeeping operation comprising a plurality of weighing operations.

23. Scale according to claim 22, wherein the default memory areas are designed so that the identification data designating the bookkeeping operation in question and the encryption data generated therefrom can be stored in the form of header data for the bookkeeping data.

24. Scale according to claim 23, wherein the header data comprise the number of the machine on which the first set of weighing data of the bookkeeping operation was generated, the time and the date on which the first bookkeeping entry was made, and/or a check sum determined on the basis of these data.

25. Scale according to claim 23 or claim 16, wherein the memory unit has a printer memory area, in which the header data, possibly together with additional data, are stored when the corresponding bookkeeping data are to be printed out.

26. Scale according to claim 25, wherein the signal processing system has a fourth checking routine, which compares the header data of the bookkeeping data to be printed out with the header data stored in the printer memory area and allows the printout only if these two sets of data do not agree.

* * * * *